United States Patent [19]

Willemsen

[11] Patent Number: 5,042,775

[45] Date of Patent: Aug. 27, 1991

[54] STOP VALVE AND CONTROL/MIXING SYSTEM FOR FLUIDS

[75] Inventor: Henricus J. A. Willemsen, Bladel, Netherlands

[73] Assignee: Koppens Automatic Fabrieken B. V., Bladel, Netherlands

[21] Appl. No.: 356,163

[22] Filed: May 23, 1989

[30] Foreign Application Priority Data

May 27, 1988 [EP] European Pat. Off. ........ 88201066.3

[51] Int. Cl.⁵ .......................................... F16K 31/128
[52] U.S. Cl. ................................ 251/30.02; 251/61.5; 222/14
[58] Field of Search ................ 251/30.02, 30.05, 61.5; 222/14

[56] References Cited

U.S. PATENT DOCUMENTS

| | | | |
|---|---|---|---|
| 2,541,176 | 2/1951 | Rockwell | 137/625.3 |
| 2,664,916 | 1/1954 | Conley | 251/30.02 X |
| 3,904,167 | 9/1975 | Touch et al. | 251/30.05 X |
| 3,957,244 | 5/1976 | Chauvigne | 251/30.05 |
| 3,980,002 | 9/1976 | Jarman et al. | 251/30.05 X |
| 4,189,792 | 2/1980 | Veach | 251/25 X |
| 4,673,162 | 6/1987 | Lachmann | 251/30.05 X |
| 4,725,038 | 2/1988 | Heneker et al. | 251/25 |
| 4,793,589 | 12/1988 | Eldredge et al. | 251/30.03 |

FOREIGN PATENT DOCUMENTS 59-44623 3/1984 Japan .................................... 222/14

Primary Examiner—Gerald A. Michalsky
Attorney, Agent, or Firm—Pennie & Edmonds

[57] ABSTRACT

A stop valve (1) provided with an inlet opening (2) and an outlet opening (3) which both open at one side of a sealing (4), that is adjustable for height in dependence on the pressure in an upper chamber (5) at the other side of the sealing (4). The delivery of such a stop valve is enlarged and the diameter of the passage between the inlet opening and the outlet opening is made controllable by applying pressure puls means (9-1, 9-2) connected to the upper chamber (5), which pressure puls means may generate instantaneous pressure variations in the upper chamber (5). The height of the sealing (4) can be adjusted in steps and is therewith controllable by inferencing the time duration of the pressure pulses delivered by the pressure puls means in the upper chamber.

6 Claims, 2 Drawing Sheets

STOP VALVE AND CONTROL/MIXING SYSTEM FOR FLUIDS

The invention relates to a stop valve provided with an inlet opening and an outlet opening which both open at one side of a sealing with which the diameter of a passage between the openings can be influenced because the sealing is at least partly adjustable for height, in dependence on the pressure in an upper chamber at the other side of the sealing.

The generally known stop valves are e.g. so-called magnet valves, which term includes electrically operated valves, which may be completely closed or completely open. By exciting a magnet coil a valve plate is moved, with which the pressure in the upper chamber is influenced in a manner whereby the sealing either completely opens or completely closes the passage.

The disadvantage of said known stop valve is that the degree of flow of fluids through the stop valve, from the inlet opening to the outlet opening, is not controllable. In addition there is the problem in some cases that when an other, e.g. a larger, flow capacity is required, it is usually necessary also to choose another design of the stop valve.

The purpose of the invention is to enlarge the field of application of a stop valve, in particular by enlarging the delivery and by making the diameter of the passage between the inlet opening and the outlet opening controllable.

For that purpose the stop valve according to the invention is characterized in that the stop valve is provided with pressure pulse means connected to the upper chamber, which pressure pulse means make the diameter of the passage continuously controllable by generating instantaneous pressure variations in the upper chamber.

Because of the instantaneous pressure variations in the upper chamber an average height of the sealing is adjusted as a result of the mass inertia of the sealing when there is a certain pressure ratio on both sides thereof. The height can be adjusted in steps and is therewith controllable by influencing the time duration of the pressure pulses delivered by the pressure pulse means in the upper chamber. Because the same type of stop valve now has a greater controllable delivery, a wider field of application for the stop valve according to the invention is created.

When using the stop valve in a fuel system for filling stations it is even possible, using a similar stop valve and a similar pump, therefore, to serve lorries, whose tanks generally have a capacity of a few hundred liters, as well as passenger cars, whose tanks generally have a capacity of a few dozen liters, in a short period of time.

A special application of the stop valve according to the invention is possible in automatic paying systems in filling stations. In particular when a prepaid amount is nearly reached it is now possible, according to the invention, to control the stop valve in the system automatically and have it change over to a lower output by giving the instantaneous pressure variations a longer pulse time. With this a high accuracy of the metered quantity of fluidum delivered is eventually achieved One embodiment of the stop valve according to the invention is characterized in that between the inlet opening and the upper chamber there is provided a control channel, in which a first valve of the pressure pulse means is incorporated, whereby the instantaneous pressure variations are brought about in the upper chamber by instantaneously interrupting a flow of fluid towards said upper chamber.

By means of the control channel the pressure in the upper chamber can be deduced from the fluid pressure in the inlet opening and the instantaneous pressure variations in the upper chamber can be realized by means of a simple valve, e.g. an electronically operated valve or a mechanically operated valve (e.g. from a counting mechanism in the petrol pump).

In a further embodiment the stop valve according to the invention is characterized in that an overflow channel is provided between the upper chamber and the outlet opening and a second valve of the pressure pulse means is incorporated in the overflow channel for influencing the average pressure in the upper chamber.

The advantage is that by influencing in particular the quantity of fluid in the upper chamber by means of the second valve, an influencing of the maximum height adjustment of the sealing takes place, and with it a further fine adjustment of the diameter of the passage.

In yet another embodiment the stop valve according to the invention is characterized in that the stop valve has at least one calibrating bore provided between the control channel and the overflow channel, a connecting pipe being provided on one of the two channels and on the upper chamber.

By providing a calibrating bore in the control channel and/or the overflow channel, the passage of said bore possibly being adjustable, the controllability of the stop valve is improved The speed with which the sealing closes can namely be influenced by adjusting the passage of the calibrating bore.

Another embodiment of the stop valve according to the invention is characterized in that the sealing is a roller membrane clamped at its circumference between assembled parts of the stop valve.

The advantage of using a roller membrane in the stop valve according to the invention lies in the fact that it has no sliding parts, in contrast with the sealing being a piston. As a result of that only little power is required for moving the roller membrane when the stop valve is operated pulsatingly.

A very simple embodiment of the stop valve according to the invention is characterized in that the roller membrane is a fibre-reinforced roller membrane.

A further possible embodiment of the stop valve according to the invention is characterized in that at least the inner circumferential part of the sealing is provided with a thick sealing plate, whereby the sealing plate, bearing against an internal mouth of the inlet opening, shuts off the passage.

Yet another embodiment of the stop valve according to the invention is characterized in that on the sealing plate there is fitted a mounting plate which at least partly corresponds with the inner circumference of the internal mouth of the inlet opening, a flexible O-ring being provided between the sealing plate and the mounting plate.

The advantage of this embodiment according to the invention is that a very good sealing between the inlet opening and the outlet opening has been realized by means of the flexible O-ring.

In addition, when the sealing is opened it will do so easily and it will not stick as a result of the the O-ring being used.

The stop valve according to the invention has a very good controllability, also with a small diameter of the passage, when it is characterized in that a tubular control valve is fitted to the mounting plate, substantially V-shaped flow ports being provided in the wall of the control valve.

In this last embodiment the vibrations, as well as the sound produced are minimal when fluid flows through the stop valve according to the invention A further refinement of the regulating range is achieved in that the stop valve according to the invention is characterized in that the locations of the various tops of the V-shapes of the flow ports, seen along the axis of the control valve, are different.

By choosing the shape and the location of the generally V-shaped flow ports the desired regulation curve can be further defined. Thus it will be possible to realize e.g. a linear curve of the fluid output.

A preferential embodiment of a control system according to the invention is characterized in that the control system contains a stop valve having electrically operated pressure pulse means and that the control system contains a control unit connected to a volumeter and the pressure pulse means for the delivery by the control system of a desired quantity of fluid in a certain time, corresponding with an adjustable curve of the fluid output. The control system according to the invention is in particular suitable for liquids, particularly for use in fuel systems. Further advantages of the control system are i.a. the low cost price of the various parts and the simple mounting, whereby in general fewer knees and tee pieces are required than with the known control systems. In addition a more compact construction will be possible as a result. In general the control unit will be a computer-controlled control unit, whereby the operation of the electric pressure pulse means, constructed as electrically operated valves, can be programmed to have an output of e.g. 40, 80 or 130 liters per minute. Furthermore it will be possible with the control unit to program the curve of the output as a function of time.

A preferential embodiment of a mixing system according to the invention for mixing several kinds of fluid in certain volume ratios is characterized in that the mixing system contains at least two stop valves, whereby the respective fluids are supplied to the respective stop valves through fluid supply pipes, in which respective volumeters are incorporated, and that the mixing system is provided with a control unit for delivering a fluid mixture in the desired volume ratio to a discharge pipe, said volume ratio corresponding with an adjustable curve of the fluid mixture output.

Using the mixing system according to the invention is particularly advantageous in those countries which, in addition to fuels having a fixed octane number, also supply fuels having intermediate octane numbers. Said intermediate octane numbers can be simply adjusted on the pump to desire and be presented to the control unit as a programmed function for realizing the desired octane number of the fuel mixture in the discharge pipe.

The invention will be further explained hereinafter with reference to a drawing, in which corresponding reference numbers indicate the same elements.

Figure 1:
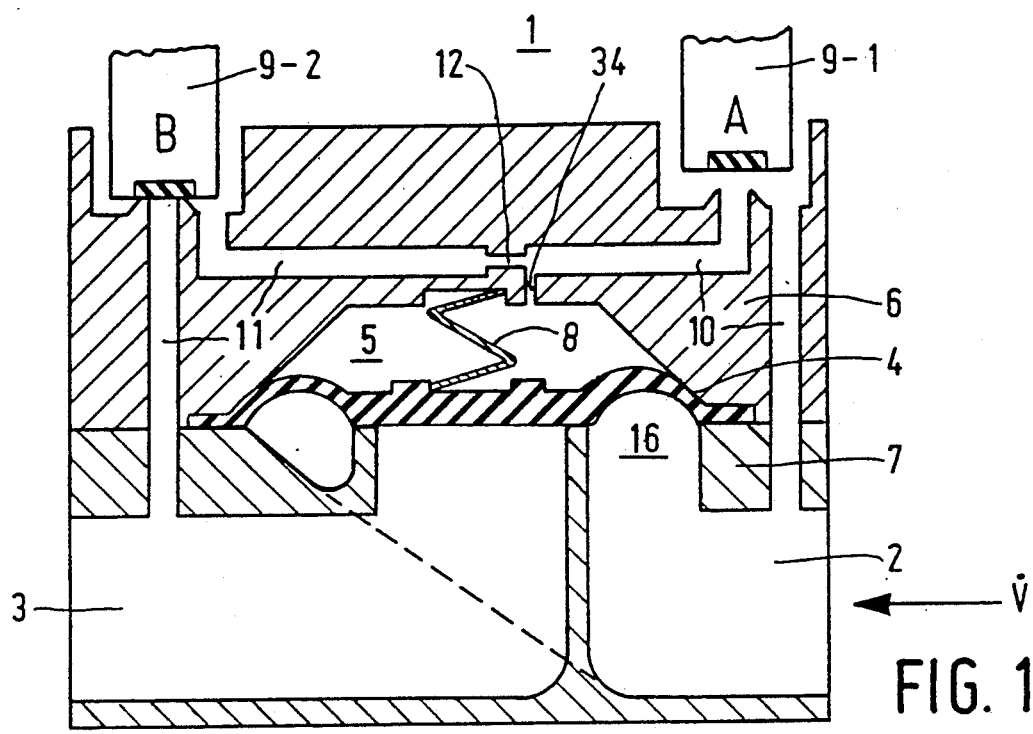
FIG. 1 is a possible embodiment of the stop valve according to the invention.

FIG. 1 illustrates a stop valve 1, also called delivery control valve. Said stop valve is used to control volume flows of fluids. Fluids which may be used are e.g. gases or liquids. In the latter case especially fuels are to be thought of. The stop valve is especially used in fuel pump systems and automatic paying systems.

The stop valve 1 is provided with an inlet opening 2 and an outlet opening 3, which both open on one side of a sealing 4. The membrane 4 is vertically adjustable in the direction of an upper chamber 5. The membrane 4 may be constructed as a piston, not shown, in which case the piston is movable in the direction of the upper chamber. However, the movement of such a piston results in friction with the wall of the upper chamber.

The sealing 4 illustrated in FIG. 1 is elastic and is clamped at its circumference, in a simply mounted manner, between a cover part 6 and a bottom part 7 of the stop valve 1. In the upper chamber 5 there may be provided a compression spring 8 which is fitted to the sealing 4. The spring 8 additionally damps the movement of the sealing 4.

Pressure pulse means can be connected to the upper chamber 5. The pressure pulse means deliver pressure pulses having a certain period. In the upper chamber 5 an average pressure is adjusted, in dependence on the duration of the pressure pulses. On the other side of the sealing 4 there prevails a pressure which depends on the fluid pressure in the inlet opening 2, as well as on the fluid pressure in the outlet opening 3. The sealing 4 is vertically adjusted to a greater or less degree, dependent on the equilibrium of pressure, as a result of which a certain diameter of the passage between the openings 2, 3 is adjusted. In this manner a continuous, stepwise controllable diameter of the passage has been realized with instantaneous pressure variations in the upper chamber 5.

In one embodiment the pressure pulse means are constructed as a valve 9-1, also indicated by a capital letter A. Between the inlet opening 2 and the upper chamber 5 there is provided a control channel 10. In the control channel 10 there is incorporated the first valve 9-1, which effects instantaneous pressure variations in the upper chamber 5 by instantaneously interrupting the flow of fluid from the inlet opening 2 to the upper chamber 5. In one embodiment, not shown, the control channel 10 opening into the inlet opening 2 may be connected directly to a pump or piston, not shown, instead of to the valve 9-1 and the upper chamber, for generating the pressure variations.

In the embodiment of the stop valve 1 illustrated in FIG. 1 an overflow channel 11 runs from the upper chamber 5 to the outlet opening 3. Said overflow channel 11 may be constructed as a hole, not shown, to be provided in the sealing 4. The pressure pulse means furthermore have a second valve 9-2, provided in the overflow channel 11. The operation of the preferential embodiment of FIG. 2 thus developed will be further explained with reference to table 1.

TABLE 1

| A | B | Sealing membrane | $\dot{V}$ |
| --- | --- | --- | --- |
| open | closed | closes | →0 |
| open | open | closes | — |

TABLE 1-continued

| A | B | Sealing membrane | V |
|---|---|---|---|
| closed | open | opens | →max |
| closed | closed | intermediate position | 0←→max |

In table 1 the first column indicates the position of the first valve A, the second column indicates the position of the second Valve B, the third column indicates the position of the sealing 4 and in the final column the flow V of liquid is indicated. The operation of the stop valve 1 having valves 9-1, 9-2 is as follows: (it is noted thereby that the operation of the stop valve having only one valve can simply be deduced from table 1). By opening the valve. A fluid will be forced into the upper chamber 5 as a result of the generally high pressure in the inlet opening 2. The sealing 4 moves downward, because conversely the pressure in the outlet opening 3 is generally low, and the sealing 4 assumes the position illustrated in FIG. 1. By opening the valve B and keeping the valve A closed fluid can flow out of the upper chamber 5, because the pressure in the outlet opening 3 is generally lower than in the upper chamber 5, after which the stop valve 1 can open to its maximum. When both valves A and B are open it will generally depend on the actual construction of the stop valve and on the dimensioning of e.g. the inlet opening 16 opening at the sealing 4, as well as on the spring pressure and the diameter of the control channel 10 and the overflow channel 11 if, and if so, to what extent the sealing 4 will open. This is indicated by means of a bar in table 1. When both valves A and B are closed the sealing 4 will generally assume an intermediate position between 0 and maximal. By exciting the valves A and B in a regulation curve to be determined empirically, and having them open or close, possibly intermittently or simultaneously, a suitable diameter of the passage or a suitable curve of the diameter can be adjusted continuously controllably.

Figure 2:
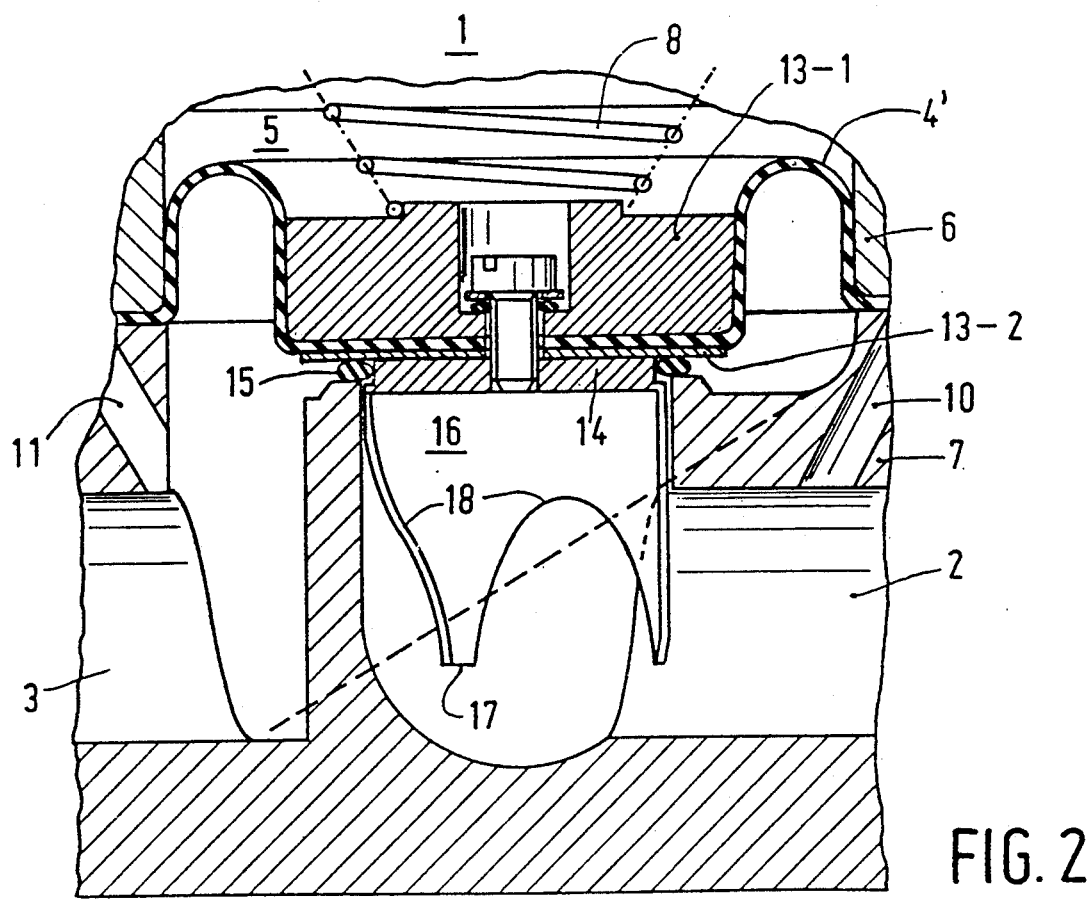
FIG. 2 is a further possible embodiment of the stop valve according to the invention, provided with a roller membrane having an O-ring and a control valve.

The stop valve 1 illustrated in FIG. 1 is furthermore provided with a calibrating bore 12 provided between the control channel 10 and the overflow channel 11. Said calibrating bore 12 is formed by a constriction, as a result of which the pressure in the overflow channel 11 is reduced relatively to the pressure in the control channel 10. Said reduction improves the controllability of the stop valve 1, whereby the sealing 4 closes more slowly with reduction than without reduction. It depends also on the use of the stop valve 1 whether the latter is acceptable or not. In the stop valve 1 shown the calibrating bore 12 is provided in the overflow channel 11 and a connecting pipe 34 is provided between the control channel 10 and the upper chamber 5. Possibly a calibrating bore 12 is formed by an auxiliary means, not shown, with which the passage of the calibrating bore 13 can be adjusted electronically. A calibrating bore, not shown, may (also) be provided in the control channel 10, if desired.

in FIG. 2 a further preferential embodiment of the stop valve 1 is further worked out and illustrated in detail. This embodiment of the stop valve 1 contains a sealing 4 constructed as a roller membrane 4'. The circumference of the generally cylindrical roller membrane 4' is clamped between the cover part 6 and the bottom part 7. The roller membrane 4' may e.g. be constructed as a fibre-reinforced membrane in order to provide it with sufficient solidity and stiffness.

The inner circumferential part of the roller membrane 4' is clamped between sealing plate parts 13-1 and 13-2. The generally flattened sealing plate part 13-2 can shut off the internal mouth 16 of the inlet opening 2 against the sealing 4. Possibly the sealing plate part 13-2 is provided with a mounting plate 14. The outer circumference of the mounting plate 14 corresponds at least partly with the inner circumference of the internal mouth 16 of the outlet opening 2 at the spot of the sealing 4. The inner circumference of the other part of the mounting plate 14 is smaller and a flexible O-ring 15 is incorporated therein. When the stop valve 1 closes the ring 15 is deformed somewhat and thus guarantees a good sealing. When the stop valve 1 opens the ring 15 prevents that the internal mouth 16 sticks to the sealing plate part 13-2.

Figure 3:
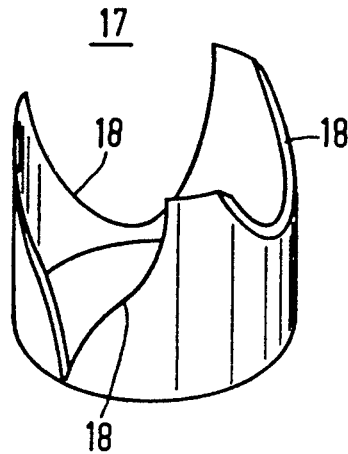
FIG. 3 is an isometric illustration of the control valve for use in the stop valve according to FIGS. 1 or 2.

On the mounting plate 14 there is fitted a tubular control valve 17, which is shown in FIG. 3 in an isometric illustration. The wall of the control valve 17 is provided with substantially V-shaped flow ports 18. In order to achieve a further improvement of the regulation curve of the stop valve 1 the various tops of the V-shaped flow ports 18 may have different locations along the wall of the control valve 17, as is also shown in FIG. 3. The diameter of the control valve 17 is preferably cylindrical. Possibly a constriction of the cylindrical diameter of the control valve 17 is realized, in case this should be desirable in connection with vibrations and sounds being produced by the fluid flowing through the stop valve 1. The specific form of the flow port may be determined experimentally. In the embodiment of FIG. 3 at least one top of the flow port indicated by the reference number 18 is located near the mounting plate 14.

Figure 4:
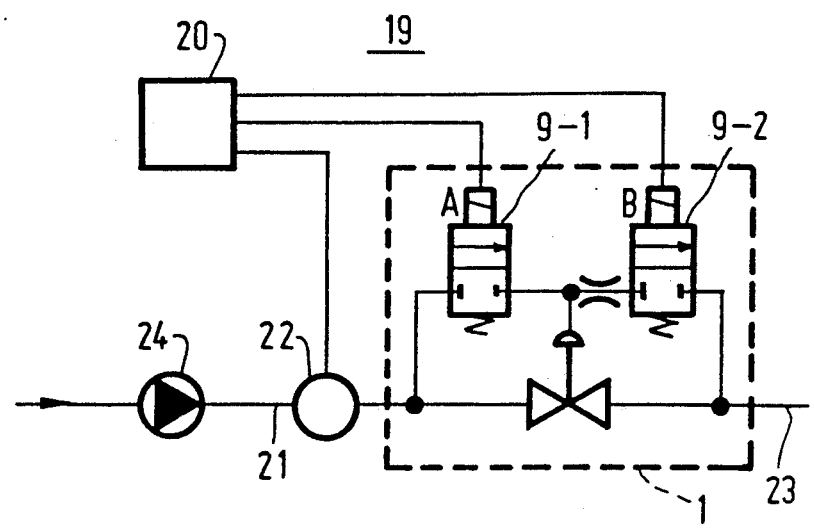
FIG. 4 is a control system with a stop valve according to the invention.

In FIG. 4 a possible embodiment of a control system 19 is illustrated. The control system 19 contains the stop valve 1 and a control unit 20. The two valves A and B are separately connected to the control unit 20. In the fluid supply pipe 21 to the stop valve 1 there is incorporated a volumeter 22. The volumeter 22 delivers an electric signal which is a measure for the volume of the quantity of passing fluid. The volumeter 22 is electrically connected to the control unit 20. If desired a volumeter, not shown, may be incorporated in a fluid discharge pipe 23, which volumeter can also be connected to the control unit 20. The control system 19 can be used as an automatic paying device for fuel delivery systems. In such paying systems a certain amount is paid, after which a quantity of fuel to be measured is delivered. In particular with a low fuel output a good and accurate controllability of the control system is of major importance. This is furthermore important with automatic paying devices, because here the last few liters of fuel are delivered slowly in order not to exceed the prepaid amount. Control unit 20 will generally be a programmable, e.g. microprocessor-controlled unit. Dependent on the fact whether the customer is a large-scale or a small-scale consumer the delivery of fuel may also be set as a function of time by using a control algorithm which has been incorporated in the software. In the fluid supply pipe 21 there is furthermore incorporated a pump 24.

Figure 5:
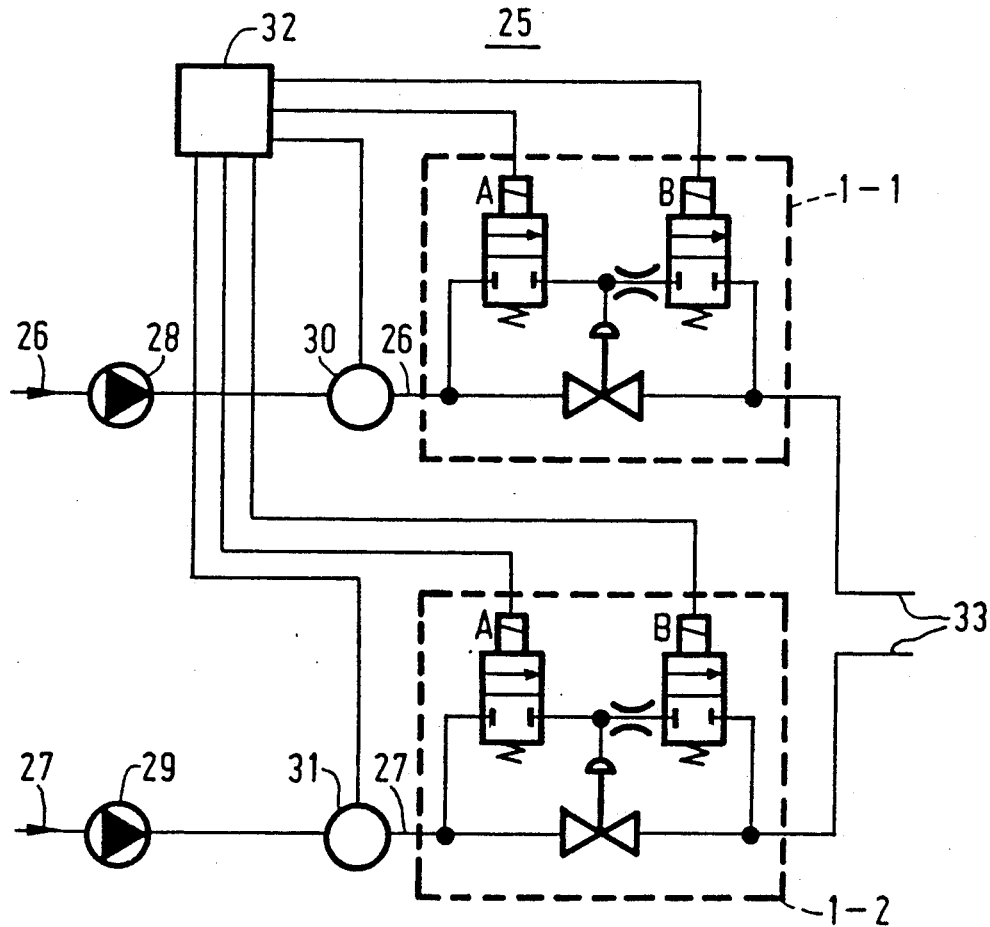
FIG. 5 is a mixing system incorporating two stop valves according to the invention.

FIG. 5 illustrates a mixing system for fluids. The mixing system 25 is particularly suitable for mixing various kinds of fuel, such as e.g. premium petrol and regular petrol, in order to obtain a fuel mixture after mixing which has a certain octane number. The mixing system 25 contains two, preferably identical stop valves indicated by 1-1 and 1-2. The mixing system 25 furthermore contains pumps 28 and 29 incorporated in the respective supply pipes 26 and 27, as well as volumeters 30 and 31. The mixing system 25 furthermore contains a control unit 32, which is connected to the volumeters 30 and 31 and to the stop valves 1-1 and 1-2. The control unit 32 is arranged for adjusting the octane number and the output dependent on the customer's wishes, as well as the curve of the mixture output as a function of time of the quantity of mixed fuel delivered. In general the input of these data which depend on the customer will be effected via the software. The fuel mixture is available at discharge pipe 33 in a desired composition and in a desired output.

The control units 20 and 32 may e.g. have a microprocessor, whether or not provided with relays or electronically switchable transistors or thyristors. An example of a minimum pulse time casu quo switch time of the valves A and B is e.g. 60 m seconds.

I claim:

1. A control system (19), comprising a stop valve (1) wherein said stop valve comprises
    - a cover part (6) and a bottom part (7) assembled together and defining an upper chamber (5), and inlet (2) communicating directly with the upper chamber (5) and an outlet (3) also communicating directly with the upper chamber (5), said inlet further communicating with the upper chamber through a control channel (10) and a connecting pipe (34) defined by the assembled parts (6, 7), and said outlet (3) also further communicating with the upper chamber (5) through an overflow channel (11) similarly defined by the assembled parts (6, 7) and communicating with the control channel (10) and the connecting pipe (34),
    - a raisable means for sealing (4) the inlet (2) and outlet (3) off from the upper chamber (5) at the location of the direct communication between the upper chamber and the inlet and outlet, said inlet and outlet opening on the same side of the raisable sealing means (4), and said raisable sealing means being raisable relative to the inlet (2) and outlet (3) in response to pressure variations in said upper chamber (5) to define a variable passage between the inlet and outlet, and wherein the raisable means for sealing (4) is a roller membrane (4') having an inner circumferential part and being clamped at its outer circumference between assembled part (6, 7) of the stop valve (1),
    - a pressure pulse means for generating instantaneous pressure variations in the upper chamber comprising a valve (9-1) disposed in the control channel (10) wherein said pressure pulse means (9-1) is electrically operated, whereby pressure variations acting on the raisable sealing means are dampened by the control channel and connecting pipe to provide a highly stable and responsive stop valve,
    - a sealing plate (13-2) provided on the inner circumferential part of the roller membrane (4') bearing against and sealing the inlet (2),
    - a mounting plate (14) fitted to the sealing plate (13-2) and corresponding approximately in diameter to the inner diameter of the inlet (2),
    - an O-ring (15) provided around the mounting plate (14) thereby providing an enhanced seal between the sealing plate (13-2) and the inlet (2),
    - a tubular control valve (17) fitted to the mounting plate (14) and extending into the inlet (2), said valve (17) having substantially V-shaped flow ports (18) provided in the valve wall, wherein the V-shaped flow ports (18) of the tubular control valve (17) have top portions located at varying levels relative to an end of said valve (17); and
    - a control unit (20) connected to a volunteer (22) and the pressure pulse means (9-1) for the delivery by the control system (19) of a desired quantity of fluid in a certain time, corresponding with an adjustable curve of the fluid output.

2. The stop valve (1) according to claim 1, wherein the pressure pulse means comprises a second valve (9-2) incorporated in the overflow channel (11) for influencing the average pressure in the upper chamber (5).

3. A control system (19), comprising:
    - a stop valve (1) provided with an inlet (2) and an outlet (3) which both open at one side of a raisable means for sealing (4), said sealing means comprising a roller membrane (4') having an inner circumferential part with a sealing plate provided thereon and being clamped at its outer circumference between assembled parts (6, 7) of the stop valve (1) and further comprising a mounting plate (14) corresponding approximately in diameter to the inner diameter of the inlet (2) fitted to the sealing plate (13-2), an O-ring (15) provided around the mounting plate (14) thereby providing an enhanced seal between the sealing plate (13-2) and the inlet, and a tubular control valve (17) fitted to the mounting plate (14) and extending into the inlet (2), said valve (17) having substantially V-shaped flow ports (18) provided in the valve wall, wherein the V-shaped flow ports (18) of the tubular control valve (17) have top portions located at varying levels relative to an end of said valve (17); said roller membrane (4') defining a passage between the inlet and outlet (2, 3), the size of the passage being adjustable dependent upon the pressure in an upper chamber (5) defined by the assembled parts on the opposite side of said membrane (4') from the inlet and outlet; said stop valve being provided with an electrically operated pressure pulse means (9-1, 9-2) communicating with the upper chamber (5), which pressure pulse means make the diameter of the passage continuously controllable by generating instantaneous pressure variations in the upper chamber (5); said stop valve having a control channel (10) between the inlet (2) and the upper chamber (5) in which a first valve (9-1) of the pressure pulse means is incorporated, said first valve (9-1) bringing about the instantaneous pressure variations in the upper chamber (5) by instantaneously interrupting a flow of fluid towards said upper chamber through the control channel; said stop valve further having an overflow channel (11) between the upper chamber (5) and the outlet (3) with a second valve (9-2) of the pressure pulse means incorporated in the overflow channel (11) for influencing the average pressure in the upper chamber (5); and said stop valve (1) further defining a connecting pipe (34) communicating with said channels (10, 11) and the upper chamber (5); and
    - a control unit (20) connected to a volunteer (22) and the pressure pulse means (9-1, 9-2) for the delivery by the control system (19) of a desired quantity of fluid in a certain time, corresponding with an adjustable curve of the fluid output.

4. The stop valve according to claim 2 or 3 wherein in the assembled parts further define a calibrating bore (12) providing communication between the control channel (10) and the overflow channel (11) and having a reduced diameter relative to said channels.

5. Stop valve (1) according to claim 1 or 3, wherein the roller membrane (4′) is a fiber-reinforced roller membrane.

6. A control system including in combination: a stop valve, comprising a cover part (6) and a bottom part (7) assembled together and defining an upper chamber (5), an inlet (2) communicating directly with the upper chamber (5) and an outlet (3) also communicating directly with the upper chamber (5), said inlet further communicating with the upper chamber through a control channel (10) and a connecting pipe (34) defined by the assembled parts (6, 7), and said outlet (3) also further communicating with the upper chamber (5) through an overflow channel (11) including a calibrating bore (12) similarly defined by the assembled parts (6, 7) and communicating with the control channel (10) and the connecting pipe (34), a raisable means for sealing (4) the inlet (2) and outlet (3) off from the upper chamber (5) at the location of the direct communication between the upper chamber and the inlet and outlet, said inlet and outlet opening on the same side of the raisable sealing means (4), and said raisable sealing means being raisable relative to the inlet (2) and outlet (3) in response to pressure variations in said upper chamber (5) to define a variable passage between the inlet and outlet, and an electrically operated pressure pulse means for generating instantaneous pressure variations in the upper chamber comprising a valve (9-1) disposed in the control channel (10) and a valve (9-2) disposed in overflow channel (11), whereby pressure variations acting on the raisable sealing means are dampened by the control channel, overflow channel and connecting pipe to provide a highly stable and responsive stop valve; and a control unit (20) connected to a volunteer (22) and the pressure pulse means (9-1) for the delivery by the control system (19) of a desired quantity of fluid in a certain time, corresponding with an adjustable curve of the fluid output.

* * * * *